(12) United States Patent
Yang

(10) Patent No.: US 8,596,814 B2
(45) Date of Patent: Dec. 3, 2013

(54) LED LIGHT TUBE AND A CIRCUIT MODULE FOR THE SAME

(76) Inventor: Cheng-Sheng Yang, Kaohsiung (TW)

( * ) Notice: Subject to any disclaimer, the term of this patent is extended or adjusted under 35 U.S.C. 154(b) by 114 days.

(21) Appl. No.: 13/372,566

(22) Filed: Feb. 14, 2012

(65) Prior Publication Data

US 2013/0207561 A1    Aug. 15, 2013

(51) Int. Cl.
*F21V 29/00* (2006.01)
*H05B 37/02* (2006.01)

(52) U.S. Cl.
USPC ........... 362/218; 362/221; 362/257; 362/390; 315/113; 315/201; 315/228

(58) Field of Classification Search
USPC ............. 315/200 R, 113, 121, 201, 228, 291, 315/297, 362; 362/218, 221, 225, 217.13, 362/249.01, 249.02, 257, 258, 390, 394, 362/656
See application file for complete search history.

(56) References Cited

U.S. PATENT DOCUMENTS

| | | | | |
|---|---|---|---|---|
| 6,936,968 B2 * | 8/2005 | Cross et al. | ...................... | 315/74 |
| 7,053,557 B2 * | 5/2006 | Cross et al. | ...................... | 315/74 |
| 8,147,091 B2 * | 4/2012 | Hsia et al. | ...................... | 362/221 |
| 8,232,249 B2 * | 7/2012 | Hartmann et al. | ........... | 514/17.7 |
| 8,235,545 B2 * | 8/2012 | Zheng et al. | ................... | 362/218 |
| 2011/0228526 A1 * | 9/2011 | Hartikka et al. | .............. | 362/221 |
| 2011/0260622 A1 * | 10/2011 | Hartikka et al. | ............... | 315/113 |
| 2012/0043892 A1 * | 2/2012 | Visser et al. | .................. | 315/121 |

* cited by examiner

*Primary Examiner* — Vibol Tan

(74) *Attorney, Agent, or Firm* — Alan Kamrath; Kamrath IP Lawfirm, P.A.

(57) ABSTRACT

The invention relates to an LED light tube and a circuit module for the same, wherein the circuit is located in a light tube body and includes a rectifying unit, a current regulating and voltage regulating unit, and an LED unit. The light tube body can be installed in a lamp-holder of a fluorescent tube without changing a starter and a ballast. The rectifying unit has two power terminals connected to electrodes of the light tube body for receiving a mains power and the rectifying unit via the electrodes. The rectifying unit converts the mains power to a sign wave DC voltage. The current regulating and voltage regulating unit is connected to the rectifying unit for converting the mains power to a working power. The LED unit is electrically connected to the current regulating and voltage regulating unit for receiving the working power to emit light.

6 Claims, 5 Drawing Sheets

LED LIGHT TUBE AND A CIRCUIT MODULE FOR THE SAME

BACKGROUND OF THE INVENTION

1. Field of the Invention

This invention relates to an LED circuit module, especially to an LED circuit module for an LED light tube.

2. Description of Related Art

FIG. 5 shows a conventional fluorescent tube 40, wherein the fluorescent tube 40 has two opposite ends; each end has a first electrode 41 and a second electrode 42. A filament 43 is connected between the first electrode 41 and the second electrode 42. The fluorescent tube 40 has noble gas and mercury (Hg) vapor inside, and fluorescence glue is spread on the internal surface of the fluorescent tube 40.

A conventional lamp-holder of the fluorescent tube 40 has a starter 51 and a ballast 52. When the fluorescent tube 40 is installed in the lamp-holder, the starter 51 is electrically connected to both of the first electrodes 41 of the two ends of the fluorescent tube 40. Both of the second electrodes 42 of the two ends of the fluorescent tube 40 are connected to a mains power (Vac), wherein the ballast 52 is connected between the mains power (Vac) and one of the second electrodes 42.

After power is provided from the mains power, a switch 50 of the starter 51 is closed. The mains power (Vac) through the filament 43 generates a high temperature for performing an ionization of the noble gas in the fluorescence tube. During the ionization of the noble gas, electrons and the mercury (Hg) vapor are generated to react with ultraviolet light. A visible light is generated after the fluorescence glue absorbs the ultraviolet light in the fluorescent tube. The visible light can be applied to general lighting. The ballast 52 is for stabilizing a current flowing through the fluorescent tube.

The fluorescent tube contains a great deal of mercury (Hg) vapor. If broken fluorescent tubes are not recycled appropriately, the mercury (Hg) vapor will evaporate into the air and cause pollution. With the pollution issue from the fluorescent tubes taken into concerns, using light emitting diodes (LEDs) can reduce pollution of the environment.

SUMMARY OF THE INVENTION

This invention provides an LED light tube and circuit module for the same. Using light emitting diodes (LEDs) as a light source unit can reduce pollution of the environment by not using fluorescent tubes which contain chemical substances such as mercury (Hg) and fluorescence glue.

The LED light tube includes a light tube body and a circuit module. The light tube body has a first end and a second end; each end has a first electrode and a second electrode. The circuit module is mounted in the light tube body and includes a rectifying unit, a current regulating and voltage regulating unit, and an LED unit. The rectifying unit includes a first power terminal electrically connected to the first electrode of the first end of the light tube body, a second power terminal electrically connected to the second electrode of the first end of the light tube body, a third power terminal electrically connected to the first electrode and the second electrode of the second end of the light tube body, and two power output terminals that are a first power output terminal and a second power output terminal for outputting a sine wave DC voltage. The current regulating and voltage regulating unit includes a first input terminal and a second input terminal respectively and electrically connected to the first power output terminal and the second power output terminal of the rectifying unit for receiving the sine wave DC voltage, and two output terminals that are a first output terminal and a second output terminal for outputting a working power. The LED unit is electrically connected to the two output terminals of the current regulating and voltage regulating unit for receiving the working power to emit light.

For achieving the invention, a circuit module of an LED light tube is connected to a light tube body that has a first end and a second end; each end has a first electrode and a second electrode.

The circuit module includes a rectifying unit, a current regulating and voltage regulating unit, and an LED unit. The rectifying unit includes a first power terminal electrically connected to the first electrode of the first end of the light tube body, a second power terminal electrically connected to the second electrode of the first end of the light tube body, a third power terminal electrically connected to the first electrode and the second electrode of the second end of the light tube body, and two power output terminals that are a first power output terminal and a second power output terminal for outputting a sine wave DC voltage. The current regulating and voltage regulating unit includes a first input terminal and a second input terminal respectively and electrically connected to the first power output terminal and the second power output terminal of the rectifying unit for receiving the sine wave DC voltage, and two output terminals that are a first output terminal and a second output terminal for outputting a working power. The LED unit is electrically connected to the two output terminals of the current regulating and voltage regulating unit for receiving the working power to emit light.

When the invention is installed in a lamp-holder of a fluorescent tube, the first power terminal or the second power terminal of the rectifying unit can receive a mains power. The current regulating and voltage regulating unit will convert the mains power to the working power. The LED unit receives the working power to emit light. The invention can be directly installed in the lamp-holder without changing a starter and a ballast circuit so as to replace the conventional fluorescent tube.

DETAILED DESCRIPTION OF PREFERRED EMBODIMENT

Figure 1:
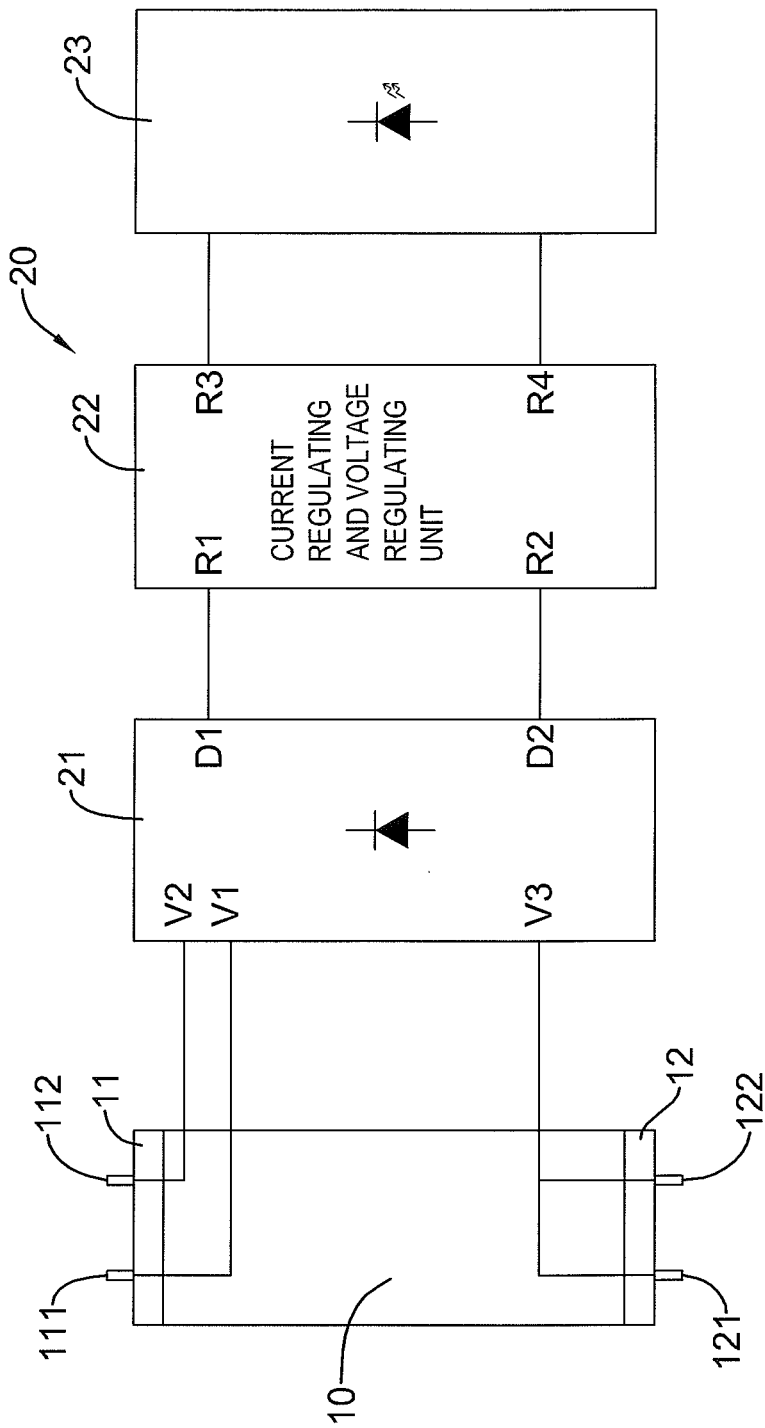
FIG. 1 is a circuit diagram of an LED light tube of this invention.
Figure 2:
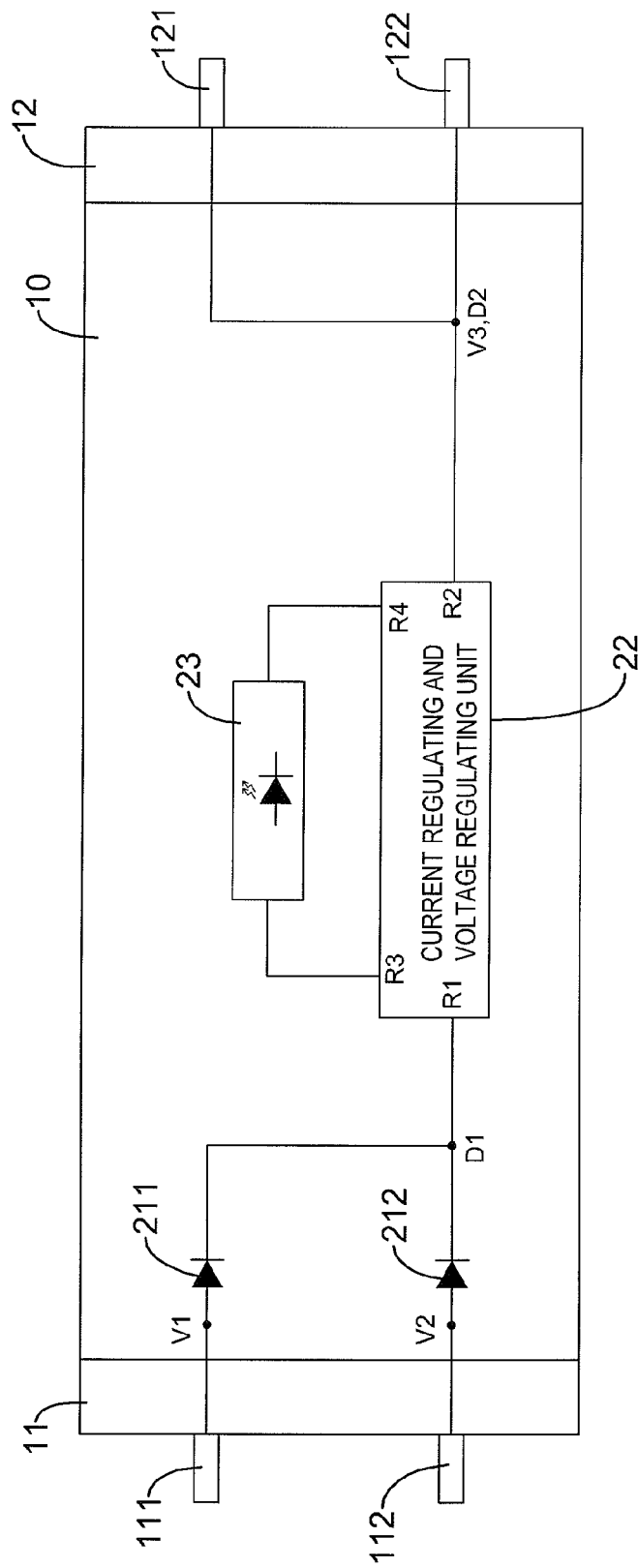
FIG. 2 is a circuit schematic diagram of a first embodiment of this invention.

FIGS. 1 and 2 are circuit diagrams of an LED light tube of a first embodiment of this invention. The LED light tube includes a light tube body 10 and a circuit module 20.

The light tube body 10 has a first end 11 and a second end 12. The first end 11 has a first electrode 111 and a second electrode 112. The second end 12 has a first electrode 121 and a second electrode 122.

The circuit module 20 is mounted in the light tube body 10 and includes a rectifying unit 21, a current regulating and voltage regulating unit 22, and an LED unit 23.

The rectifying unit 21 has a first power terminal (V1), a second power terminal (V2), a third power terminal (V3), a first power output terminal (D1), and a second power output terminal (D2).

The first power terminal (V1) is electrically connected to the first electrode 111 of the first end 11 of the light tube body 10. The second power terminal (V2) is electrically connected to the second electrode 112 of the first end 11 of the light tube body 10. The third power terminal (V3) is electrically connected to the first electrode 121 and the second electrode 122 of the second end 12 of the light tube body 10.

The first power terminal (V1), the second power terminal (V2), and the third power terminal (V3) are respectively connected to the mains power (Vac). The rectifying unit 21 converts the mains power (Vac) to a sine wave DC voltage to be outputted from the first power output terminal (D1) and the second power output terminal (D2).

The current regulating and voltage regulating unit 22 has a first input terminal (R1), a second input terminal (R2), a first output terminal (R3), and a second output terminal (R4). The first input terminal (R1) and the second input terminal (R2) are respectively and electrically connected to the first power output terminal (D1) and the second power output terminal (D2) of the rectifying unit 21 for receiving the sine wave DC voltage. The current regulating and voltage regulating unit 22 converts the sine wave DC voltage to a working power to be outputted from the first output terminal (R3) and the second output terminal (R4).

The LED unit 23 is electrically connected to the first output terminal (R3) and the second output terminal (R4) of the current regulating and voltage regulating unit 22 for receiving the working power. The LED unit 23 can be consisted of multiple LEDs connected in series or in parallel wherein the LEDs receive the working power and emit light.

FIG. 2 shows a first embodiment, wherein the rectifying unit 21 is a half-wave rectifier and includes a first diode 211 and a second diode 212.

The first diode 211 has an anode as the first power terminal (V1) and a cathode as the first power output terminal (D1) of the rectifying unit 21 electrically connected to the first input terminal (R1) of the current regulating and voltage regulating unit 22.

The second diode 212 has an anode as the second power terminal (V2) and a cathode electrically connected to the cathode of the first diode 211.

The third power terminal (V3) and the second power output terminal (D2) of the rectifying unit 21, and the second input terminal (R2) of the current regulating and voltage regulating unit 22 are connected together.

When the first embodiment is installed in a lamp-holder, assume that the first power terminal (V1) is electrically connected to a starter, and that the second power terminal (V2) is electrically connected to the mains power (Vac).

Figure 5:
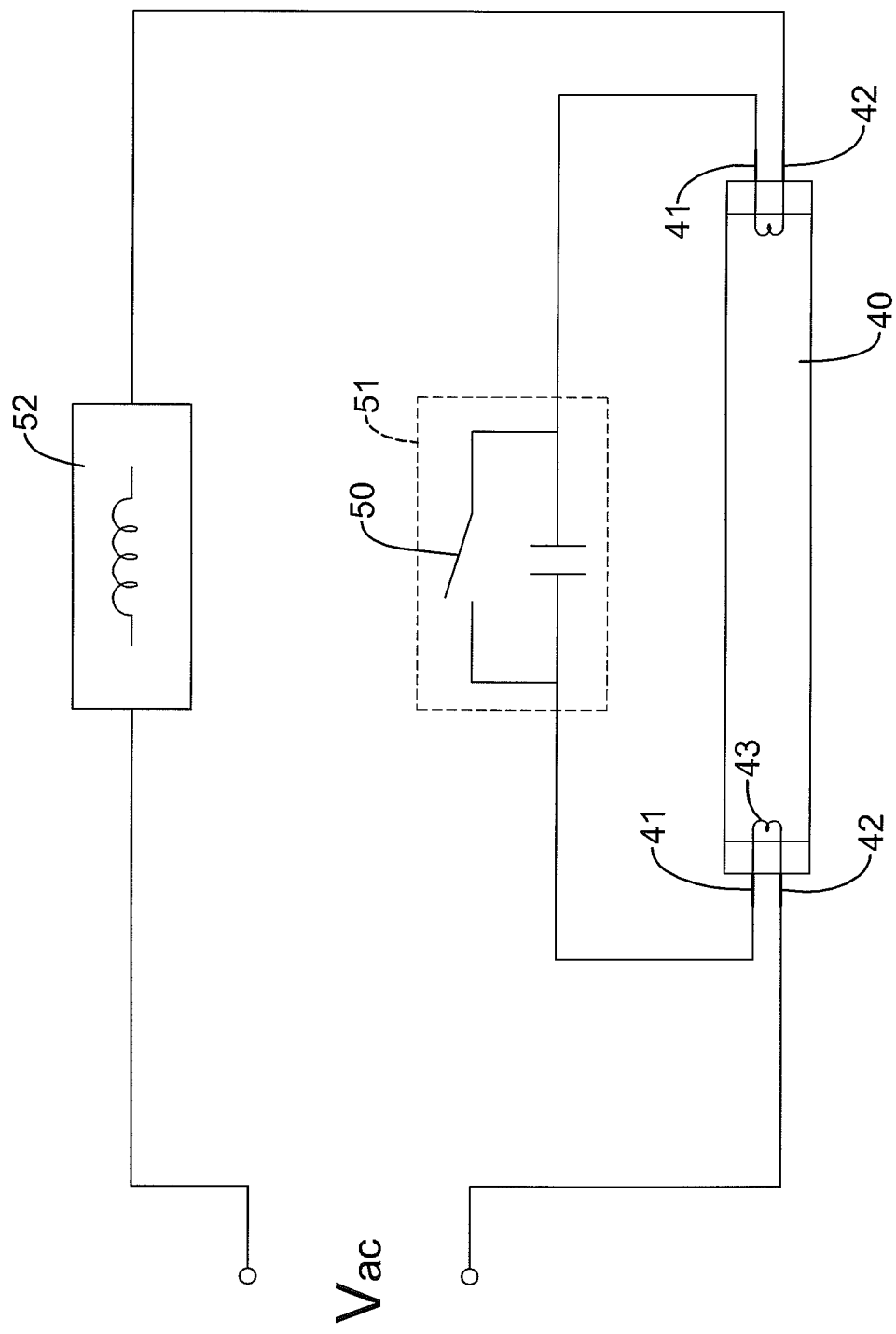
FIG. 5 is a conventional connecting diagram with a fluorescent tube, a starter, and a ballast.

With reference to FIGS. 2 and 5, if a switch of the starter is open, the first power terminal (V1) is not electrically connected to any components, so the first diode 211 and the current regulating and voltage regulating unit 22 form an open-circuit. The second diode 212, the current regulating and voltage regulating unit 22, the LED unit 23, and the mains power (Vac) form a loop. The mains power (Vac) is converted to a half-wave DC voltage through the second diode 212. The half-wave DC voltage becomes a working power through the current regulating and voltage regulating unit 22. The LED unit 23 receives the working power to emit light.

On the other hand, if the switch of the starter is closed, the anode of the first diode 211 and the second input terminal (R2) of the current regulating and voltage regulating unit 22 form a short-circuit. The first diode 211 is connected between the first input terminal (R1) and the second input terminal (R2) of the current regulating and voltage regulating unit 22 to form a parallel loop with the current regulating and voltage regulating unit 22. At this moment, a loop is formed by the second diode 212, the current regulating and voltage regulating unit 22, and the LED unit 23, and is not affected by the first diode 211. The LED unit 23 still can receive the working power from the current regulating and voltage regulating unit 22 to emit light.

Assume that the second power terminal (V2) is electrically connected to the starter, and that the first power terminal (V1) is electrically connected to the mains power (Vac). If the switch of the starter is open, a loop is formed by the first diode 211, the current regulating and voltage regulating unit 22, the LED unit 23, and the mains power (Vac).

If the switch of the starter is short, the second diode 212 is connected between the first input terminal (R1) and the second input terminal (R2) of the current regulating and voltage regulating unit 22 to form a parallel loop with the current regulating and voltage regulating unit 22. At this moment, a loop is formed by the first diode 211, the current regulating and voltage regulating unit 22, and the LED unit 23, and is not affected by the second diode 212.

Figure 3:
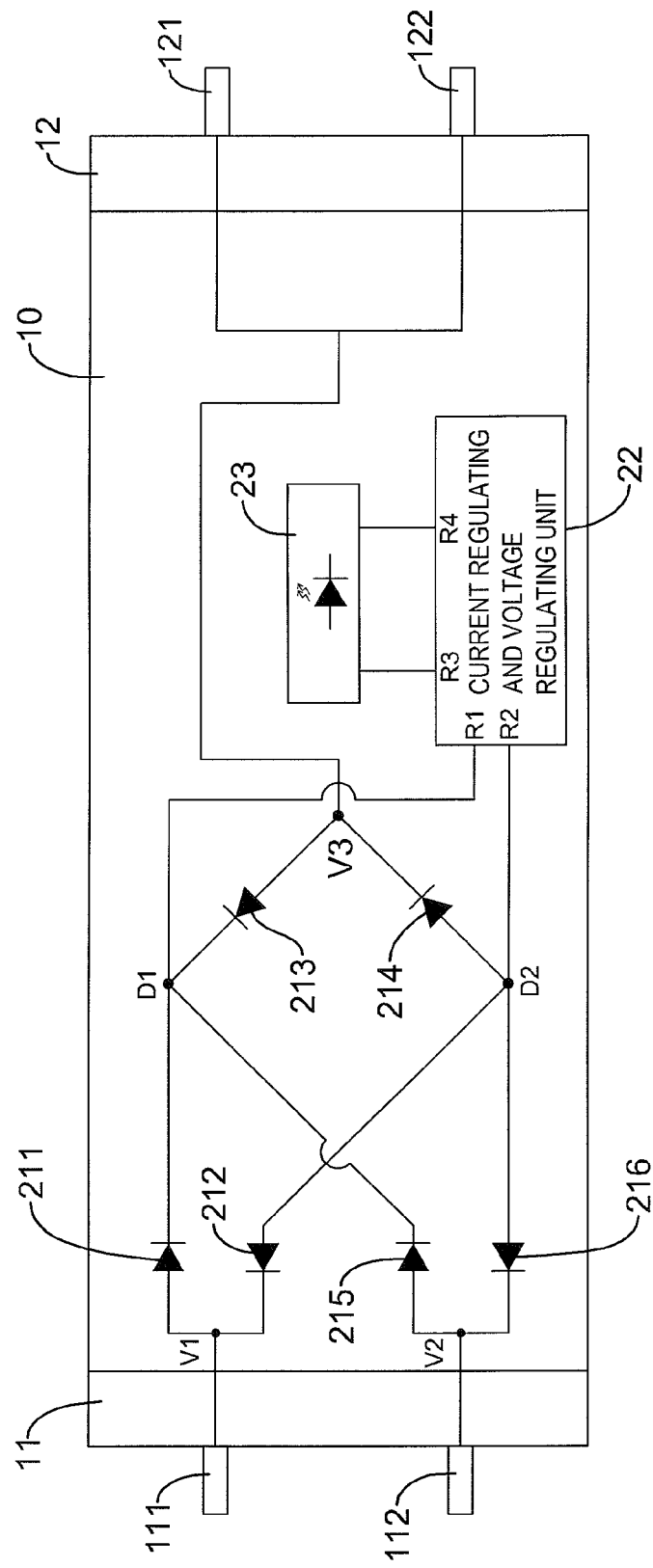
FIG. 3 is a circuit schematic diagram of a second embodiment of this invention.

In a second embodiment, as shown in FIG. 3, the rectifying unit 21 is a full-wave rectifier including a first diode 211, a second diode 212, a third diode 213, a fourth diode 214, a fifth diode 215, and a sixth diode 216. Each of the diodes 211, 212, 213, 214, 215 and 216 has an anode and a cathode.

The anode of the first diode 211 can be the first power terminal (V1). The cathode of the first diode 211 can be the first power output terminal (D1) of the rectifying unit 21 and is electrically connected to the first input terminal (R1) of the current regulating and voltage regulating unit 22. The cathode of the second diode 212 is electrically connected to the anode of the first diode 211. The anode of the second diode 212 can be the second power output terminal (D2) of the rectifying unit 21 and is electrically connected to the second input terminal (R2) of the current regulating and voltage regulating unit 22. The cathode of the third diode 213 is electrically connected to the cathode of the first diode 211. The anode of the third diode 213 can be the third power terminal (V3) and is electrically connected to the first electrode 121 and the second electrode 122 of the second end 12 of the light tube body 10. The anode of the fourth diode 214 is electrically connected to the anode of the second diode 212. The cathode of the fourth diode 214 is electrically connected to the anode of the third diode 213. The anode of the fifth diode 215 can be the second power terminal (V2). The cathode of the fifth diode 215 is electrically connected to the cathode of the third diode 213. The cathode of the sixth diode 216 is electrically connected to the anode of the fifth diode 215. The anode of the sixth diode 216 is electrically connected to the anode of the fourth diode 214.

In the second embodiment, the invention is installed in the lamp-holder. Assume that the first power terminal (V1) is electrically connected to the starter, and that the second power terminal (V2) is electrically connected to the mains power (Vac). If the switch of the starter is open, the first power terminal (V1) is not electrically connected to any components, so the first diode 211, the second diode 212, and the current regulating and voltage regulating 22 form an open-circuit. A full-wave rectifier is consisted of the third diode 213, the fourth diode 214, the fifth diode 215, and the sixth diode 216. A loop is formed by the full-wave rectifier, the current regulating and voltage regulating unit 22, the LED unit 23 and the mains power (Vac). The mains power (Vac) is converted to a full-wave DC voltage by the full-wave rectifier. The full-wave DC voltage is converted to a working power by the current regulating and voltage regulating unit 22. The LED unit 23 receives the working power to emit light.

Figure 4:
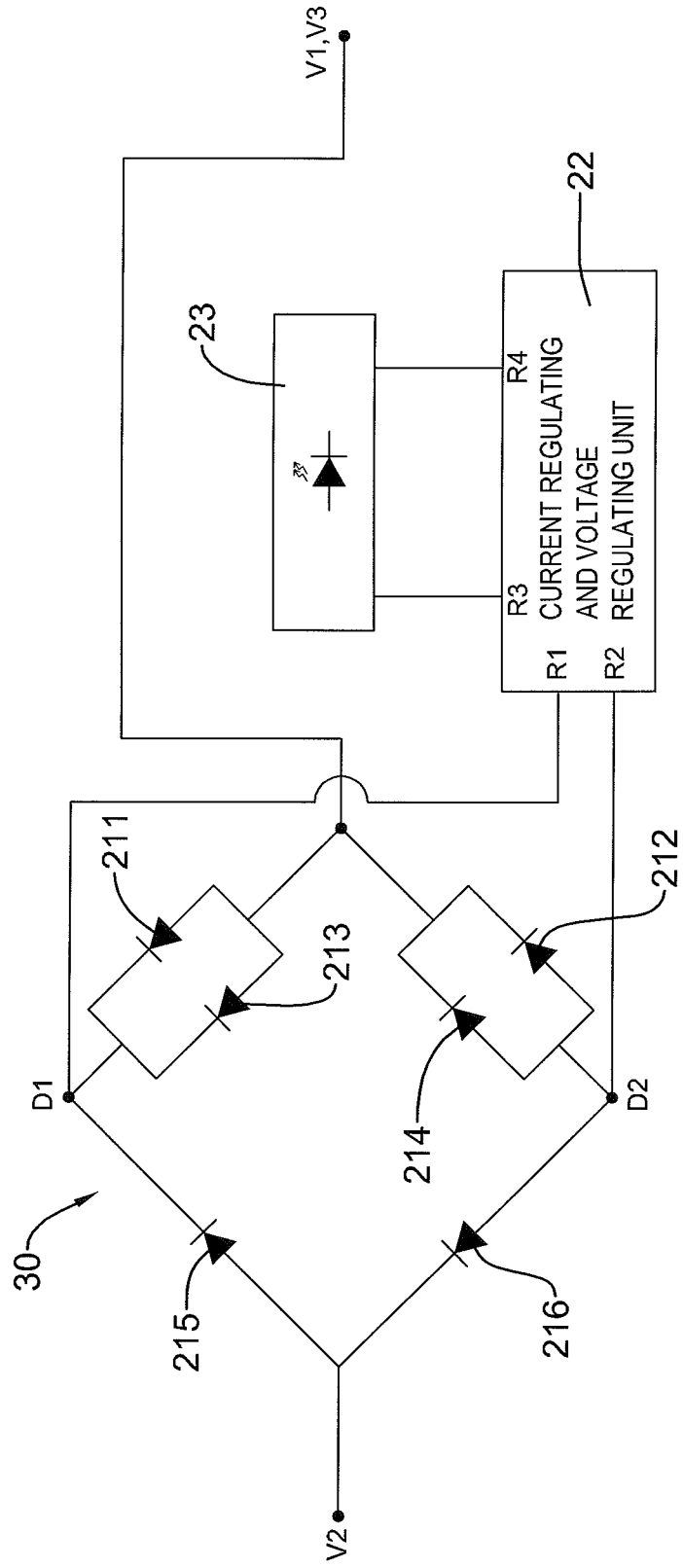
FIG. 4 is an equivalent circuit diagram as FIG. 3.

If the switch of the starter is closed, the first electrode 111 of the first end 11 of the light tube body 10 is electrically connected to the first electrode 121 of the second end 12, so the first power terminal (V1) and the third power terminal (V3) form a short-circuit. The equivalent circuit diagram is shown in FIG. 4. The first diode 211 is in parallel with the third diode 213, and the second diode 212 is in parallel with the fourth diode 214. A full-wave rectifier 30 is consisted of all the diodes 211 to 216 for generating the full-wave DC voltage. The full-wave DC voltage is converted to the working power by the current regulating and voltage regulating unit 22 to drive the LED unit 23 to emit light.

With reference to FIG. 3, assume that the second power terminal (V2) is electrically connected to the starter, and that the first power terminal (V1) is electrically connected to the mains power (Vac).

If the switch of the starter is open, the fifth diode 215, the sixth diode 216, and the third power terminal (V3) form a open-circuit, so a full-wave rectifier is consisted of the first diode 211, the second diode 212, the third diode 213, and the fourth diode 214.

If the switch of the starter is closed, the second power terminal (V2) and the third power terminal (V3) from a short-circuit. The fifth diode 215 is in parallel with the third diode 213, and the sixth diode 216 is in parallel with the fourth diode 214, so a full-wave rectifier is consisted of all the diodes 211 to 216.

To summarize, this invention can directly apply the LED light tube in the lamp-holder of a fluorescent tube. When the invention is installed in the lamp-holder, the first power terminal or the second power terminal can be electrically connected to the starter or the ballast. Whether the switch of the starter is open or closed, the current regulating and voltage regulating unit 22 is not affected for providing the working power to drive the LED unit 23 to emit light.

What is claimed is:
1. An LED light tube comprising:
   a light tube body having a first end and a second end; each end having a first electrode and a second electrode; and
   a circuit module mounted in the light tube body and comprising:
      a rectifying unit comprising:
         a first power terminal electrically connected to the first electrode of the first end of the light tube body;
         a second power terminal electrically connected to the second electrode of the first end of the light tube body;
         a third power terminal electrically connected to the first electrode and the second electrode of the second end of the light tube body; and
         two power output terminals that are a first power output terminal and a second power output terminal for outputting a sine wave DC voltage;
      a current regulating and voltage regulating unit comprising:
         two input terminals that are a first input terminal and a second input terminal respectively and electrically connected to the first power output terminal and the second power output terminal of the rectifying unit for receiving the sine wave DC voltage; and
         two output terminals that are a first output terminal and a second output terminal for outputting a working power; and
      an LED unit electrically connected to the two output terminals of the current regulating and voltage regulating unit for receiving the working power to emit light.

2. The LED light tube as claimed in claim 1, the rectifying unit comprising:
   a first diode comprising:
      an anode as the first power terminal; and
      a cathode as the first power output terminal of the rectifying unit electrically connected to the first input terminal of the current regulating and voltage regulating unit;
   a second diode comprising:
      an anode as the second power terminal; and
      a cathode electrically connected to the cathode of the first diode;
   the third power terminal and the second power output terminal of the rectifying unit, and the second input terminal of the current regulating and voltage regulating unit connected together.

3. The LED light tube as claimed in claim 1, the rectifying unit comprising:
   a first diode comprising:
      an anode as the first power terminal; and
      a cathode as the first power output terminal of the rectifying unit electrically connected to the first input terminal of the current regulating and voltage regulating unit;
   a second diode comprising:
      a cathode electrically connected to the anode of the first diode; and
      an anode as the second power output terminal of the rectifying unit electrically connected to the second input terminal of the current regulating and voltage regulating unit;
   a third diode comprising:
      a cathode electrically connected to the cathode of the first diode; and
      an anode as the third power terminal;
   a fourth diode comprising:
      an anode electrically connected to the anode of the second diode; and
      a cathode electrically connected to the anode of the third diode;
   a fifth diode comprising:
      an anode as the second power terminal; and
      a cathode electrically connected to the cathode of the third diode;
   a sixth diode comprising:
      a cathode electrically connected to the anode of the fifth diode; and
      an anode electrically connected to the anode of the fourth diode.

4. A circuit module for an LED light tube adapted to connect to a light tube body that has a first end and a second end, and each end having a first electrode and a second electrode, the circuit module comprising:
   a rectifying unit comprising:
      a first power terminal electrically connected to the first electrode of the first end of the light tube body;
      a second power terminal electrically connected to the second electrode of the first end of the light tube body;
      a third power terminal electrically connected to the first electrode and the second electrode of the second end of the light tube body; and two power output terminals that are a first power output terminal and a second power output terminal for outputting a sine wave DC voltage;
a current regulating and voltage regulating unit comprising:
two input terminals that are a first input terminal and a second input terminal respectively and electrically connected to the first power output terminal and the second power output terminal of the rectifying unit for receiving the sine wave DC voltage; and
two output terminals that are a first output terminal and a second output terminal for outputting a working power; and
an LED unit electrically connected to the two output terminals of the current regulating and voltage regulating unit for receiving the working power to emit light.

5. The circuit module of the LED light tube as claimed in claim 4, the rectifying unit comprising:
a first diode comprising:
an anode as the first power terminal; and
a cathode as the first power output terminal of the rectifying unit electrically connected to the first input terminal of the current regulating and voltage regulating unit;
a second diode comprising:
an anode as the second power terminal; and
a cathode electrically connected to the cathode of the first diode;
the third power terminal and the second power output terminal of the rectifying unit, and the second input terminal of the current regulating and voltage regulating unit connected together.

6. The circuit module of the LED light tube as claimed in claim 4, the rectifying unit comprising:
a first diode comprising:
an anode as the first power terminal; and
a cathode as the first power output terminal of the rectifying unit electrically connected to the first input terminal of the current regulating and voltage regulating unit;
a second diode comprising:
a cathode electrically connected to the anode of the first diode; and
an anode as the second power output terminal of the rectifying unit electrically connected to the second input terminal of the current regulating and voltage regulating unit;
a third diode comprising:
a cathode electrically connected to the cathode of the first diode; and
an anode as the third power terminal;
a fourth diode comprising:
an anode electrically connected to the anode of the second diode; and
a cathode electrically connected to the anode of the third diode;
a fifth diode comprising:
an anode as the second power terminal; and
a cathode electrically connected to the cathode of the third diode;
a sixth diode comprising:
a cathode electrically connected to the anode of the fifth diode; and
an anode electrically connected to the anode of the fourth diode.

* * * * *